United States Patent [19]

McIntyre et al.

[11] Patent Number: 5,297,052
[45] Date of Patent: Mar. 22, 1994

[54] INTEGRATED FAULT-TOLERANT AIR DATA INERTIAL REFERENCE SYSTEM

[75] Inventors: Melville D. W. McIntyre, Bellevue; David L. Sebring, Snohomish, both of Wash.

[73] Assignee: The Boeing Company, Seattle, Wash.

[21] Appl. No.: 613,219

[22] Filed: Nov. 14, 1990

Related U.S. Application Data

[63] Continuation-in-part of Ser. No. 422,145, Oct. 16, 1989, abandoned.

[51] Int. Cl.$^5$ .............................................. G01C 19/02
[52] U.S. Cl. ...................................... 364/453; 364/434; 33/321; 74/5.34
[58] Field of Search ................... 364/424.01, 434, 453, 364/559, 566; 371/11.3, 36; 244/194; 74/5.34; 73/178 R, 504; 33/321

[56] References Cited

U.S. PATENT DOCUMENTS

| | | | |
|---|---|---|---|
| 3,403,874 | 10/1968 | Boskovich et al. | 244/194 |
| 3,739,646 | 6/1973 | O'Conner et al. | 74/5.34 |
| 3,805,235 | 4/1974 | Foster et al. | 244/194 X |
| 3,918,309 | 11/1975 | O'Conner et al. | 74/5.34 |
| 4,020,702 | 5/1977 | Epstein | 74/5.34 |
| 4,115,847 | 9/1978 | Osder et al. | 244/194 X |
| 4,125,017 | 11/1978 | Dhuyvetter et al. | 74/5.34 X |
| 4,179,818 | 12/1979 | Craig | 74/5.34 X |
| 4,212,443 | 7/1980 | Duncan et al. | 364/453 X |
| 4,280,188 | 7/1981 | Weinstein et al. | 364/453 X |
| 4,303,978 | 12/1981 | Shaw et al. | 364/453 |
| 4,622,667 | 11/1986 | Yount | 371/68.3 X |
| 4,644,538 | 2/1987 | Cooper et al. | 371/11.3 |
| 4,771,427 | 9/1988 | Tulpule et al. | 371/36 X |
| 4,914,598 | 4/1990 | Krogmann et al. | 364/453 X |

OTHER PUBLICATIONS

"A Multi-DME/Inertial System for Aircraft Positioning", Latham & Richards, *Navigation: Journal of The Institute of Navigation;* vol. 24, No. 1, Spring '77.

*Primary Examiner*—Jack B. Harvey
*Assistant Examiner*—Ed Pipala
*Attorney, Agent, or Firm*—Bruce A. Kaser; Joan H. Pauly

[57] ABSTRACT

A fault-tolerant air data and inertial navigation reference system utilizes skewed axis inertial sensors and fault-tolerant redundant electronics to provide higher redundancy with fewer parts. Parallelly operating processor circuits each receive the individual outputs of six skewed-axis gyros and six skewed-axis accelerometers. Each processor independently processes parity equations using the outputs to identify malfunctioning sensors. Further, the output of each processor is transmitted to three parallelly operating voter circuits. The voters are operable to discard a processor if its output does not agree with the majority. The voter outputs are similarly fed back to the processor circuits, which compare these outputs, and discard any voter whose output disagrees with the majority, thus providing a completely integrated system.

10 Claims, 7 Drawing Sheets ized by the U.S. Patent Office by Ser. No. 422,145, now abandoned.

INTEGRATED FAULT-TOLERANT AIR DATA INERTIAL REFERENCE SYSTEM

The present application is a continuation-in-part of an earlier application filed on Oct. 16, 1989, which is identified in the U.S. Patent Office by Ser. No. 422,145, now abandoned.

DESCRIPTION

1. Technical Field

The invention disclosed here relates to inertial reference systems and air data systems that are used for controlling aircraft flight. More particularly, the invention relates to inertial reference and air data systems that have built-in redundancies for avoiding system failure in the event of a fault in one or more components making up the system.

2. Background Art

In the decade between the introduction of the Boeing Company's 747 and 767 models, advances in technology resulted in a two-to-one reduction in cost of inertial reference and air data systems, and a five-to-one increase in the reliability of these systems. These cost-/reliability benefits resulted primarily from the development and implementation of "strap-down" inertial reference systems, and digital air data computers used in conjunction with ARINC 429 interfaces.

Boeing's commercial air transports of the current generation (Boeing 757 and 767) use three, independent ARINC 704 strap-down inertial reference units (IRUs) to provide the inertial reference information required for primary flight deck displays, and automatic flight control and navigation. These are respectively indicated at 1, 3 and 5 in FIG. 4, which is labeled "prior art". As would be familiar to a person skilled in the art, each IRU 1, 3, 5 is an independent modular unit having a set of three orthogonally-oriented gyroscopes (gyros), and three orthogonally-oriented accelerometers. Each IRU 1, 3, 5 contains its own processor. Standby attitude is provided by a panel-mounted, self-contained gyro/horizon instrument 9.

Air data parameters for current generation transports are provided by two ARINC 706 air data computers (ADCs). These are connected to conventional pitot tubes and static ports by pneumatic tubing that runs throughout the aircraft. Certain standby air data instruments and other systems, including primary flight control modules located in aircraft tail areas, are also connected to the pitot/static port tubing.

The conventional air data system is not shown in FIG. 4, nor is it illustrated elsewhere in the drawings as it would be well familiar to a person skilled in the art. The skilled person would know, for example, how an air data computer takes static air pressure and ram air pressure data from the static ports and pitot tubes, and uses such data to determine aircraft altitude, airspeed and rate of climb or descent.

In order to achieve significant improvements in the operational efficiency of the next generation of commercial aircraft, it will be necessary to redesign many onboard systems, including the inertial reference and air data systems. The kinds of specific improvements that will be sought lie in the areas of reducing equipment price, maintenance costs, weight, volume and power requirements. Although the current generation inertial reference and air data sensor systems have demonstrated excellent performance, and indeed, have proven to be more reliable than what was initially predicted, the cost of producing these systems, and associated maintenance costs, currently represent significant components of an aircraft's overall operating costs. The thrust of the present invention, therefore, is to provide a functionally better inertial reference and air data system that also provides cost improvements.

To facilitate a better understanding of the development of the invention, reference is first drawn to FIG. 5. The top half of this FIG. shows the major components making up a typical inertial reference and air data system used on modern aircraft, like the current generation Boeing 767, for example. This system is basically divided into two parts: a redundant primary system 11 and a standby system 13. The primary system 11 is redundant in the sense that it includes the redundant IRUs 1, 3, 5 shown in FIG. 4, which make up the inertial reference system 15 shown there, and redundant air data computers 17, 19, which make up an air data system 21. The standby system 13 typically includes a single, panel-mounted gyro/horizon display 23, an altimeter 25 and an air speed instrument 27.

The cockpit display of attitude, airspeed and altitude is regarded as "flight critical". Current regulations require the maximum probability of functional loss for flight critical functions to be less than one in one billion flight hours. This requires extremely high system integrity, the responsibility for which is shared between the primary and standby systems 11, 13.

The IRUs 1, 3, 5 described above are essentially modular units. Each has three orthogonal gyros and three orthogonal accelerometers. A problem with this type of design is that if one gyro or one accelerometer in an individual IRU 1, 3, 5 fails, the entire unit is taken out of service. In other words, one failed sensor can essentially cause the unit's remaining five nonfailed sensors to be wasted.

In order to meet flight safety requirements in the event of an IRU failure, airlines are forced into maintaining large inventories of spare IRUs. For example, a spare IRU, as schematically indicated at 29, may be kept in inventory for each aircraft in service. The primary system 11, including a spare IRU 29, therefore represents a total of twelve gyros (three per IRU), twelve accelerometers (three per IRU) and seven processors.

Seven processors are required because each IRU (four, including the spare) utilizes a processor, and the two air data computers each utilize a processor. Furthermore, although two, redundant air data computers are shown as being included in the primary system 11, the airlines typically must keep a spare 31 in the event of an in-service failure. This makes a total of seven processors required.

As will become apparent, utilization of the present invention reduces the numbers of gyros and accelerometers required, and significantly reduces the number of processors required. Further, as will also become apparent, overall system reliability is increased substantially over current generation systems.

SUMMARY OF THE INVENTION

The design philosophy leading to the development of an air data inertial reference system (ADIRS) in accordance with the present invention is schematically illustrated at 10 and 35 in FIG. 5. The significant attribute of the invention is that it retains the classic primary and standby architecture 11, 13 of present-day systems, but proposes a more integrated architecture that features skewed axis inertial sensors, fault-tolerant electronics, and remote air data modules (ADMs). Its fault-tolerant electronic design allows it to be configured at lower cost, and with additional redundancy beyond that required to meet regulatory aircraft dispatch minimums, thus providing the airlines with the option of deferring maintenance until a convenient time.

An important part of an ADIRS system in accordance with the invention is the inertial navigation reference system. This portion includes a plurality of greater than three gyroscopes (gyros), and preferably, at least six gyros in order to meet desired redundancy levels. The gyros are skewed with respect to each other, meaning none are parallel or perpendicular. However, they are preferably skewed in symmetric fashion, in order to facilitate mathematical processing of their outputs.

An inertial navigation reference system in accordance with the invention also includes a plurality of greater than three accelerometers and, like the gyroscopes, the system preferably has six accelerometers. Like the gyros, the accelerometers are in symmetrically skewed relationship With respect to each other.

Implementing the gyros and accelerometers in the above manner provides a way of attaining a much higher degree of functional redundancy while, at the same time, utilizing far fewer parts. The sensor outputs of all gyros and accelerometers are received substantially at the same time by a plurality of four processor circuits operating in parallel. These circuits individually calculate navigational reference signals from the sensor outputs, by processing and comparing the outputs of sets of three gyros and accelerometers. The processor circuits also parallelly output navigational signals to three voter circuits.

The three voter circuits, which also operate in parallel, individually receive the outputs of all processor circuits. Each voter circuit compares the navigational reference signal output from one processor with those of the others, and discards the output from any malfunctioning processor.

The voters further output processor navigational signals onto an avionics bus. However, the output of each voter circuit is fed back to each processor circuit and, prior to output on the bus, each processor checks for malfunctioning in the voter circuits. Voter output is compared in substantially the same way as processor output, and a voter circuit is discarded if it malfunctions.

The avionics bus has three bus terminals, and the outputs of each are likewise fed back to each processor circuit. Each processor circuit checks for malfunction of the bus terminal circuits. If a majority of processors determine that a bus terminal is transmitting data on the bus which is different from what was received from the processors, they cease to supply data to the bus terminal, and shut it down.

Preferably, the processor circuits would also process air data from remotely located air data modules (ADMs), a process formerly performed by discrete air data computers. This would result in complete integration of the redundant components making up the primary system 11 of the current generation ADIRS (see FIG. 5).

A fully integrated ADIRS in accordance with the invention would, like the current generation ADIRS of FIG. 5, have a standby system. The architecture of the current generation standby system 13 has certain attractive features associated with it which should be retained, if possible. First, the standby system is totally dissimilar in design to the primary system 11. Second, it is physically separated from the primary system and can be supplied with independent power and sensor inputs. These two factors minimize the potential of common mode faults.

An ADIRS in accordance with the invention would include a low cost standby attitude and air data reference unit (SAARU), and thus adapts the primary/standby approach of the current generation ADIRS. The SAARU would carry on the desirable features of the current generation standby system in that it would be physically separated from the primary system. Also, to the extent possible, it would preferably have design dissimilarities in order to avoid common mode faults. Regardless, the SAARU would incorporate the above-described fault-tolerant integration of gyros, accelerometers and processors, although at a lower degree of redundancy, meaning fewer of these parts would be used.

The invention provides many potential benefits over and above current air data and inertial reference systems. Its integration of redundant primary reference systems, and multiple standby systems, into a single primary and single standby system, including the use of skewed axis inertial sensors, results in a total system architecture that exceeds the functional integrity of current systems. As mentioned above, this is accomplished by using about half as many parts.

Reduction in numbers of parts is beneficial because it results in a proportional reduction in weight and power consumption. Further, the total number of failures that occur over a given period of time is directly proportional to the number of parts in the system. Reducing part numbers, therefore, inherently results in fewer failures.

The invention provides an integrated fault-tolerant system that can be designed to have any desired level of redundancy, and thus functional integrity. A minimum redundancy configuration is required so that an aircraft can be dispatched following a single component failure in the system. As mentioned above, this permits deferring maintenance until it can be scheduled conveniently at some future time, thus eliminating the current need for airlines to maintain large inventories of spares or other maintenance capability. Increasing redundancy in accordance with the invention may in fact allow dispatch after many failures, and may possibly eliminate all maintenance capability for the system at the airline level.

The invention also reduces the complexity and/or eliminates the need for conventional built-in test equipment (BITE). Most modern digital avionics contain electronic circuits and software algorithms specifically designed to detect and isolate system failures. These BITE systems are typically designed after the basic system is designed, with BITE integration being the last stage in overall system development. It has been found that BITE design, development, integration and certification costs represent a very significant portion of the total nonrecurring costs associated with developing the overall system. Further, problems associated with BITE performance following certification represents significant recurring costs to both the manufacturer and the airlines. The invention disclosed here eliminates the need for conventional BITE systems.

The invention will become more completely understood after consideration of the following description when taken in conjunction with the drawings.

BRIEF DESCRIPTION OF THE DRAWINGS

In the drawings, like reference numbers and numerals indicate like parts throughout the various views, except where indicated otherwise, and wherein.

BEST MODE FOR CARRYING OUT THE INVENTION

Figure 1:
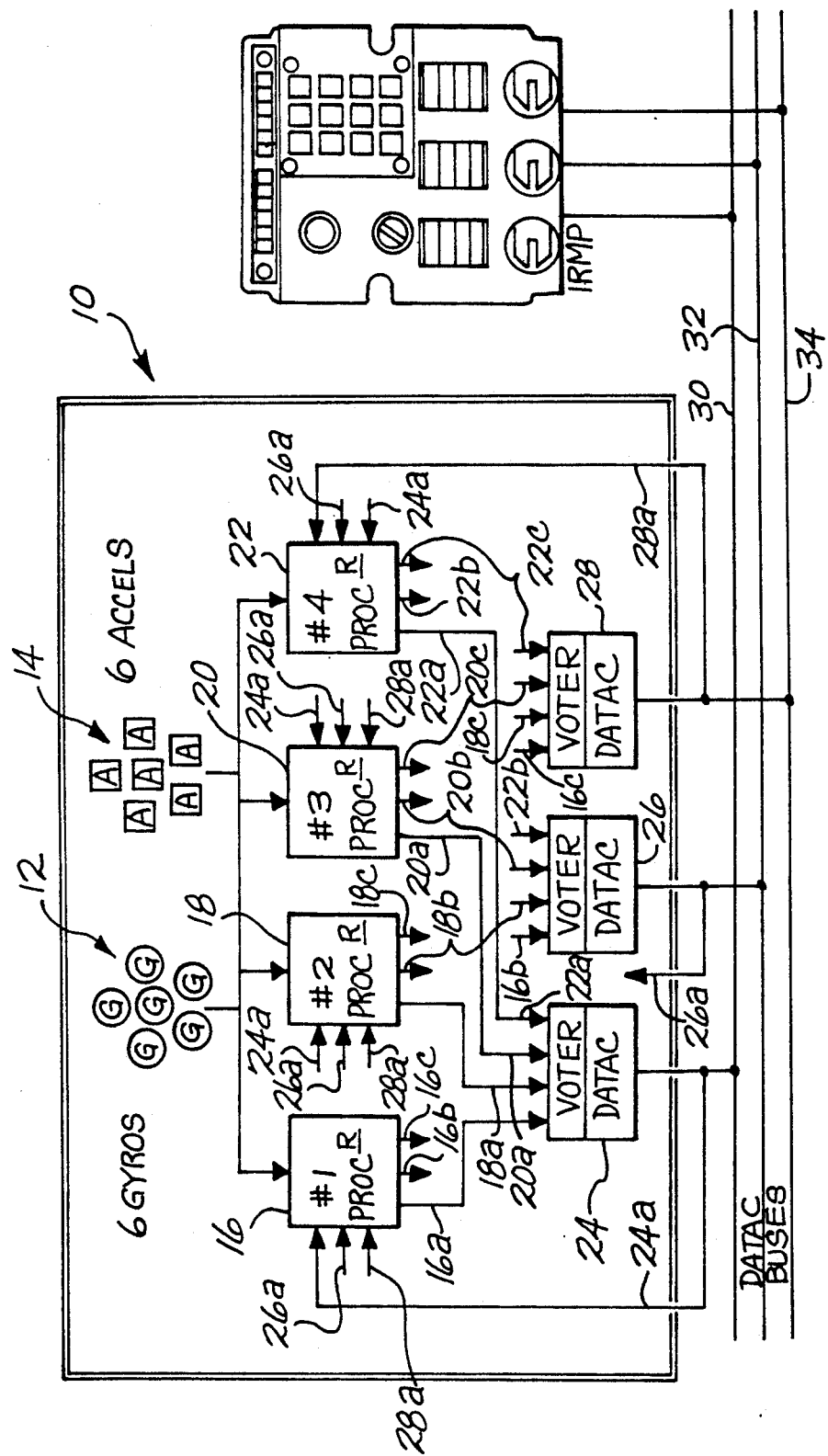
FIG. 1 is a view of a fault-tolerant inertial reference system with deferred maintenance provision in accordance with a preferred embodiment of the invention.

Referring now to FIG. 1, therein is shown at 10 a fault-tolerant inertial reference unit in accordance with a preferred embodiment of the invention. The unit 10 preferably has six gyros, indicated generally at 12, and six accelerometers, indicated generally at 14. The signals from each gyro and accelerometer are substantially simultaneously received by four processor circuits 16, 18, 20, 22.

Figure 2:
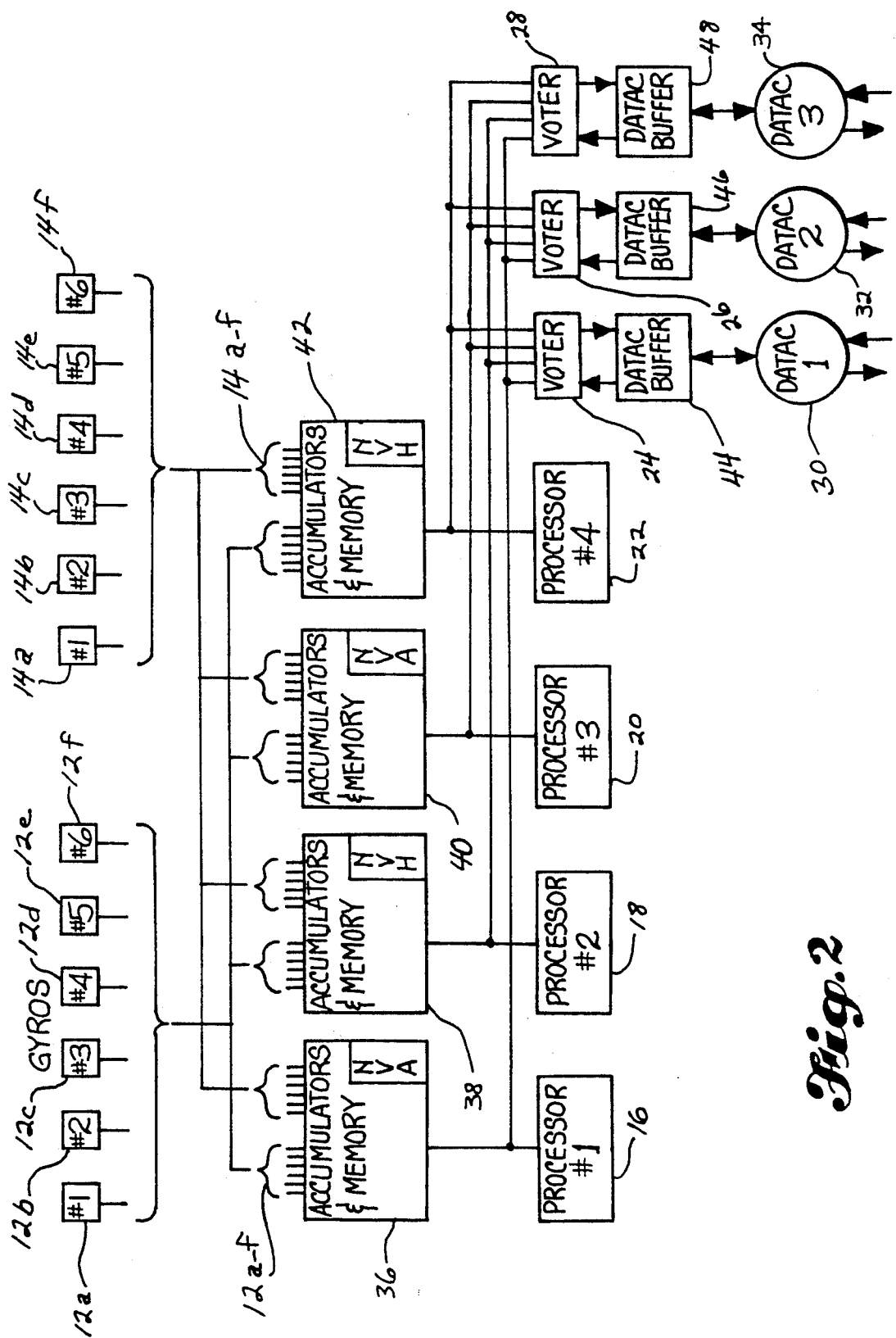
FIG. 2 is a simplified block diagram of the air data inertial reference unit shown in FIG. 1 and illustrates the use of accumulator and memory circuits to process the sensor outputs of a group of six gyros and six accelerometers.

Referring briefly to FIG. 2, gyro and accelerometer outputs $12a-f$, $14a-f$ may be received and organized in conventional accumulator and memory circuits 36, 38, 40, 42 prior to further processing. Preferably, each gyro $12a-f$ is a single degree of freedom gyro. The accelerometers 14 are conventional seismic-mass accelerometers having rebalance coils. Although the gyros 12 and accelerometers 14 are skewed, they are preferably skewed in symmetric fashion, as shown at 37 in FIG. 3.

Figure 6:
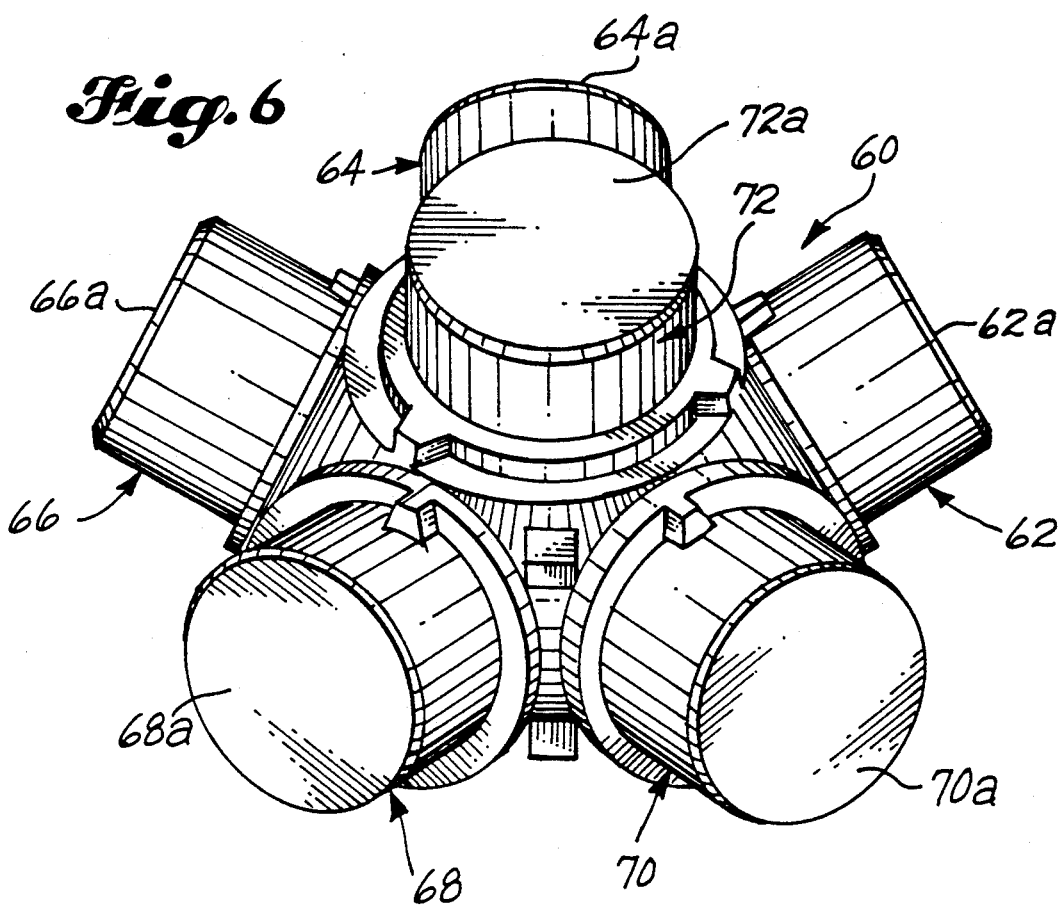
FIG. 6 is a pictorial view of a skewed axis sensor assembly in accordance with the invention.
Figure 7:
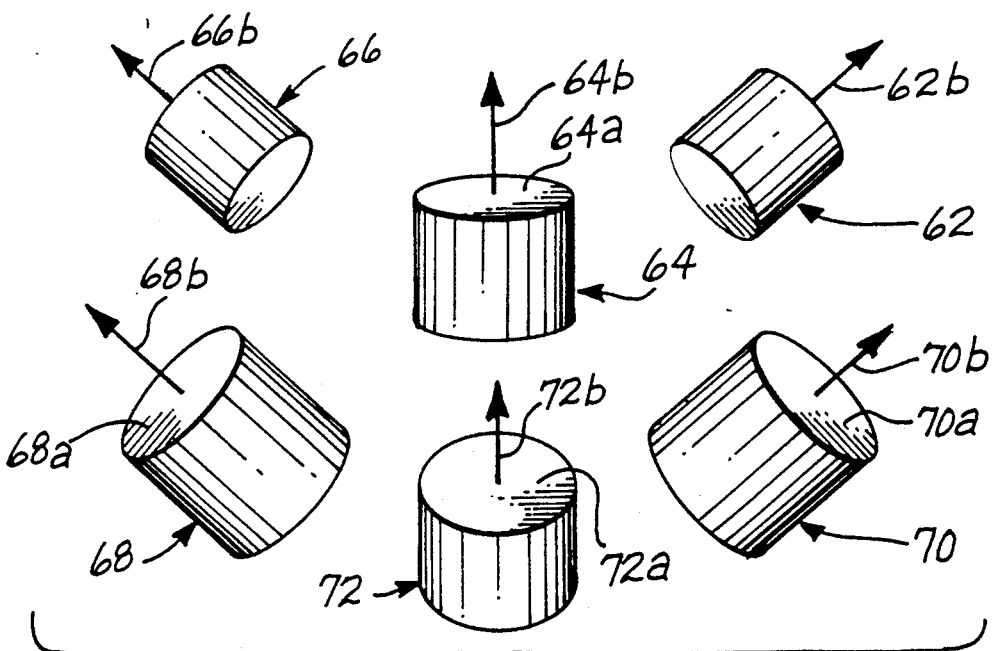
FIG. 7 is a schematic exploded view of the sensor assembly shown in FIG. 6.

Preferably, each gyro $12a-12f$ is oriented with its input axis along one of the perpendiculars to six out of a possible twelve faces of a regular dodecahedron. Referring briefly to FIGS. 6 and 7, for example, FIG. 6 shows a sensor assembly 60 in accordance with the invention having six sensor modules 62, 64, 66, 68, 70, 72 in a dodecahedral arrangement. As the skilled person would know, a dodecahedron is a polyhedron having twelve faces. The assembly 60 shown in FIG. 6, therefore, makes up half of an actual dodecahedron. The outer faces $62a$, $64a$, $66a$, $68a$, $70a$, $72a$ of each respective sensor module 62, 64, 66, 68, 70, 72 correspond to six out of twelve possible faces of a dodecahedron.

FIG. 7 shows the sensor modules 62, 64, 66, 68, 70, 72 of the FIG. 6 assembly exploded and, in accordance with the preceding description, the input axis of each gyro is positioned along axes $62b$, $64b$, $66b$, $68b$, $70b$, $72b$. Similarly, each accelerometer 14 is aligned along each of the same six axes.

The type of gyro used in the above-described arrangement is preferably a hemispherical resonating gyro, which is well known, and has long been used in the field. Other types of gyros such as, for example, ring laser gyros, could also be used. As mentioned above, conventional seismic mass accelerometers are preferably used to measure accelerations along each of the six axes, $62b$, $64b$, $66b$, $68b$, $70b$, $72b$.

Each processor 16, 18, 20, 22 reads all six gyros and accelerometers, and translates their signals into a mathematically equivalent three-axis orthogonal system that can be related to the pitch, roll and yaw axes of the aircraft. These resultant orthogonal signals are then used to compute aircraft navigational information.

Figure 10:
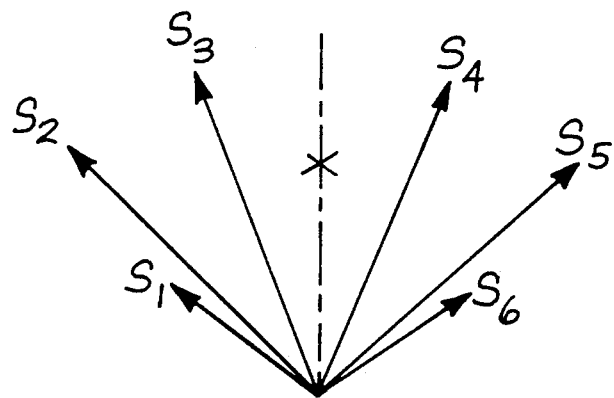
FIG. 10 is a schematic showing the skewed axis alignment of a sensor system in accordance with the invention.

Sensor errors are determined by using parity equations. For example, the sensor output of any one gyro sensor $12a-f$ or acceleration sensor $14a-f$ can be mathematically determined using linear algebra from any other group or set of three gyros or accelerometers. Equation 1 below illustrates this relationship where $S_6$ may, by way of illustrative example, identify the output of one gyro sensor in a group of six skewed-axis gyros (as shown in FIG. 10); $S_1$, $S_2$ and $S_3$ indicate the outputs of three other gyros in such system; and $a_1-a_3$ represent linear algebraic co-efficient whose values are easily determined by the physical orientation of sensors $S_1-S_3$ relative to sensor $S_6$.

$$S_6 - (a_1 S_1 + a_2 S_2 + a_3 S_3) = O + P \qquad \text{Eq. (1)}$$

If the rate generated in the above equation from ($a_1 S_1 + a_2 S_2 + a_3 S_3$) is subtracted from the output of $S_6$, it creates a parity equation that is equal to zero plus whatever sensor errors (P) appear on sensors $S_1$, $S_2$, $S_3$ and $S_6$. Ideally, if there are no errors, P should be equal, or nearly equal, to zero.

It is therefore possible to generate a combination of parity equations that make sensor errors observable without having to identify actual rates or accelerations. As mentioned previously, it is desirable that the six gyro or accelerometer sensors used in the present invention be arranged dodecahedrally. The reason for this is that it positions the sensors optimally with respect to each other for facilitating fault detection. Three independent parity equations (set forth in equations 2-4 below) would be sufficient for such a system in order to detect sensor errors.

$$P_1 = a_1 S_1 + a_2 S_2 + a_3 S_3 + a_4 S_4 + a_5 S_5 + a_6 S_6 \qquad \text{Eq. (2)}$$

$$P_2 = b_1 S_1 + b_2 S_2 + b_3 S_3 + b_4 S_4 + b_5 S_5 + b_6 S_6 \qquad \text{Eq. (3)}$$

$$P_3 = c_1 S_1 + c_2 S_3 + c_3 S_3 + c_4 S_4 + c_5 S_5 + c_6 S_6 \qquad \text{Eq. (4)}$$

Once again, the co-efficients $a_1-a_6$, $b_1-b_6$, $c_1-c_6$ in Eqs. 2-4 above represent linear algebraic co-efficients whose values are easily determined from the physical dodecahedral orientation of the sensors. In actuality, and as the skilled person would know, some of the co-efficients may have a negative value, or a value of zero.

Figure 8:
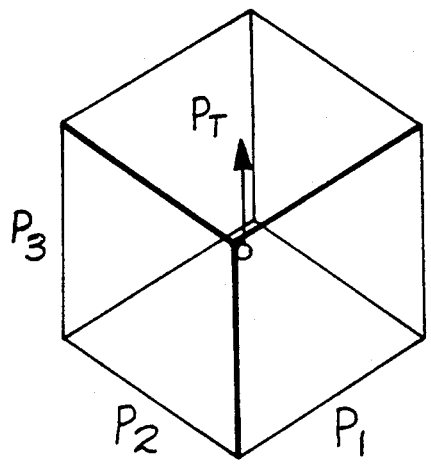
FIG. 8 is a schematic view of a three-dimensional space or graph, illustrating how the failure direction of a sensor used in accordance with the invention can be determined from parity equations.

The parity equations of equations 2-4 can be graphed in accordance with FIG. 8 to determine sensor failures. Preferably, the value of each linear equation (equations 2-4) is calculated in real time, and plotted in a parity space, also in real time for defining a vector $P_T$.

In FIG. 8, for example, $P_T$ is essentially a three-dimensional plot of $P_1$, $P_2$, $P_3$ from an origin. Failure directions for any given sensor are determined by examining the co-efficients of the above parity equations (Eqs. 2-4). A dot product is taken between each of the known sensor failure directions, as determined from the co-efficients of Eqs. 2-4, and the calculated real-time vector. The largest dot product value indicates the closest alignment to the actual measured vector $P_T$. This also indicates the most likely failed sensor.

A threshold of maximum allowable errors is selected (see FIG. 9), and if the dot product exceeds such threshold, then a fault is detected. The actual sensor can be isolated by running dot products relative to sensor failure directions as determined from the parity equations.

Figure 9:
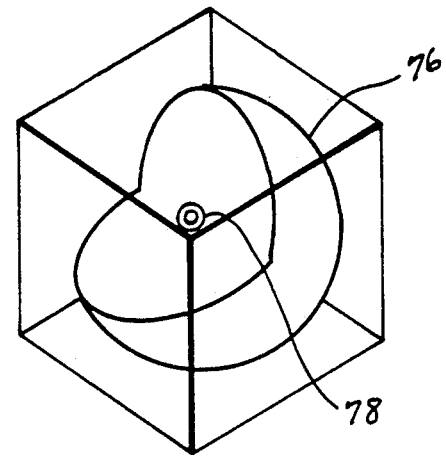
FIG. 9 is a schematic view of a three-dimensional space similar to FIG. 8, but shows an envelope of maximum allowable sensor errors, and normal errors.

Because there are certain normal sensor errors that continually occur, the threshold value for maximum allowable errors must be sufficiently distanced from normal errors. Otherwise, failures cannot be detected reliably without false alarms. This difference is also shown in FIG. 9, where reference numeral 76 indicates the threshold of maximum allowable errors, and numeral 78 indicates normal errors.

Applying the above equations to detect sensor errors, and to discard malfunctioning sensors, is the function of processor circuits 16, 18, 20, 22. Each of such circuits independently processes parity equations 2-4 and determines sensor errors therefrom.

As previously described, each gyro is oriented with its input axis along one of six perpendiculars to the faces of a regular dodecahedron. Similarly, each accelerometer is aligned along one each of the same six axes. Each processor 16, 18, 20, 22 reads all six gyros and accelerometers, and translates their signals into a mathematically equivalent three-axis orthogonal system that can be related to the pitch, roll and yaw axes of the aircraft. These resultant orthogonal signals are used to compute navigation information. Signals from the six accelerometers 14 are processed in the same manner as the gyros 12.

Referring again to FIG. 1, the signals from the gyros and accelerometers 12, 14 are received substantially simultaneously by the processors 16, 18, 20, 22. As mentioned above, conventional accumulator and memory circuits 36, 38, 40, 42 may be used in conjunction With each processor to receive the signals from each sensor 12a-f, 14a-f. Each processor 16, 18, 20, 22 calculates navigational information from the sensors 12, 14 in the above-described manner, and after discarding any malfunctioning gyro or accelerometer 12, 14, outputs navigational signals to each one of three voter circuits 24, 26, 28.

Each voter circuit 24, 26, 28 individually compares the output of each processor circuit 16, 18, 20, 22. To better understand the drawings, the output of processor 16 to voters 24, 26, 28 is identified by lines 16a, 16b, and 16c. Similar outputs from processors 18, 20 and 22 are identified by lines 18a-c, 20a-c and 22a-c, respectively. If the output of one does not correspond to the outputs of the other three (a comparison of 16a, for example, to 18a, 20a and 22a), then the voter circuit logic knows that that processor has malfunctioned (processor 16 in this example), and discards its output.

Further, the voter outputs 24a, 26a, 28a are fed back to each one of the processor circuits 16, 18, 20, 22. Each processor circuit then similarly compares the voter outputs, and if one does not agree with the others, it is discarded. Unless there is a malfunction, the outputs of the voter circuits 24, 26, 28 are transmitted onto DATAC buses 30, 32, 34 via conventional DATAC buffers 44, 46, 48. For a good explanation of the operation and protocol features of a DATAC bus, reference is drawn to U.S. Pat. No. 4,471,481, and the patents cited therein.

Figure 3:
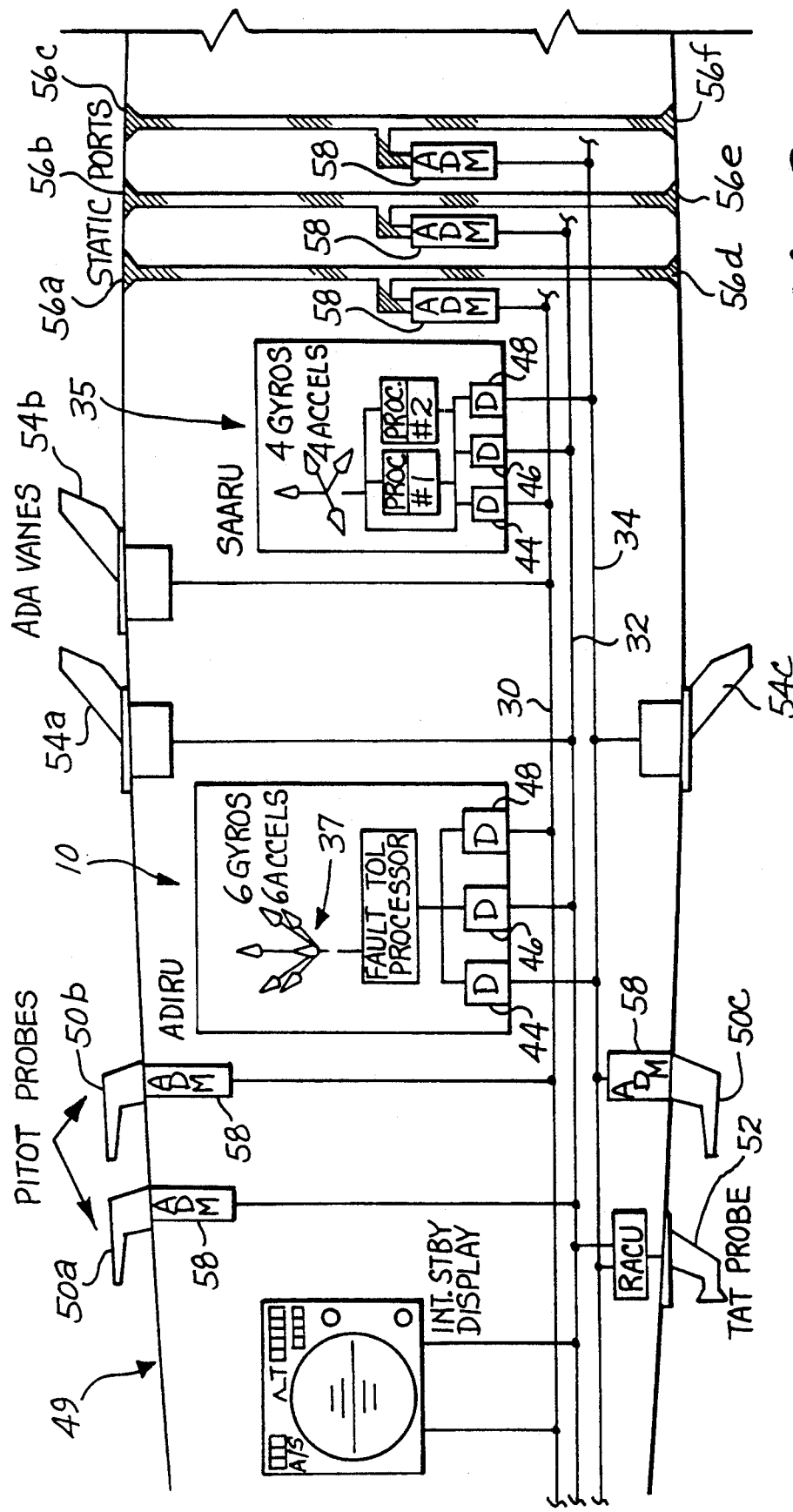
FIG. 3 is a schematic of an overall ADIRS architecture which utilizes the system shown in FIGS. 1 and 2.
Figure 5:
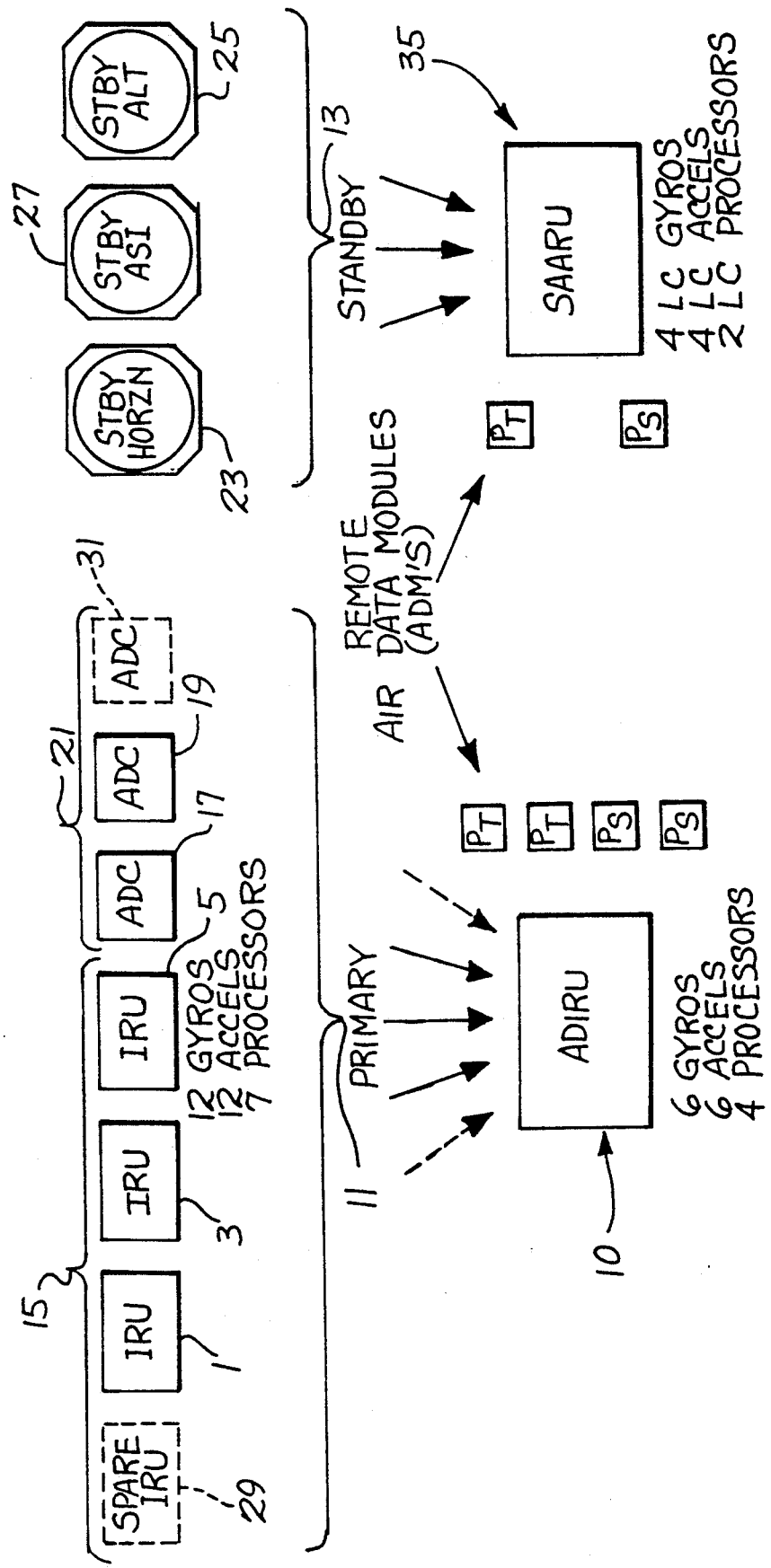
FIG. 5 is a schematic illustrating the evolution of air data inertial reference systems (ADIRS) from the current generation to that which is provided by the invention disclosed herein showing the current generation in the upper portion of the FIG. and the design of the invention in the lower portion.

FIG. 3 illustrates how the IRU system 10 of FIG. 1 is employed in the architecture of an overall ADIRS system onboard an aircraft 49. Preferably, the system 10 would be a primary system similar to the primary system 11 (see FIG. 5) of the current ADIRS. As indicated previously, the architecture of FIG. 3 would also have a standby system (SAARU), indicated generally at 35. The two systems 10, 35 are physically separated, and preferably can be supplied with independent power and sensor inputs. These two factors would minimize the potential of common mode faults between the two systems.

FIG. 3 illustrates conventional pitot probes 50a, 50b, 50c, a TAT probe 52, angle of attack (AOA) vanes 54a, 54b, 54c, and static ports 56a-f. Air data modules (ADMs) 58 output data from the pitot probes 50 and static ports 56 onto DATAC buses 30, 32, 34. As mentioned previously, the processors included in system 10 are provided with the functional capability of replacing the previous air data computers. The processors in the SAARU 35 may have a similar function. The SAARU 35 has fewer skewed-axis gyros and accelerometers (preferably four), and fewer redundant processors and voters because it is a standby unit.

To summarize, and as was stated previously, an ADIRS in accordance with the invention includes six gyros and six accelerometers. This represents an excess of redundancy over that which is required to meet minimum aircraft dispatch requirements, and provides a "spares in the box" approach, thus allowing an aircraft to remain dispatchable, and fully functional, even after several component failures have taken place. The result is that the time is increased between required maintenance actions because multiple failures of "like" component types must occur before maintenance becomes mandatory. Further, it eliminates the need for "on condition" line maintenance at the airline level; eliminates the need for airline spares; and allows maintenance to be scheduled at the convenience of the airline, all of which reduces costs significantly.

Figure 4:
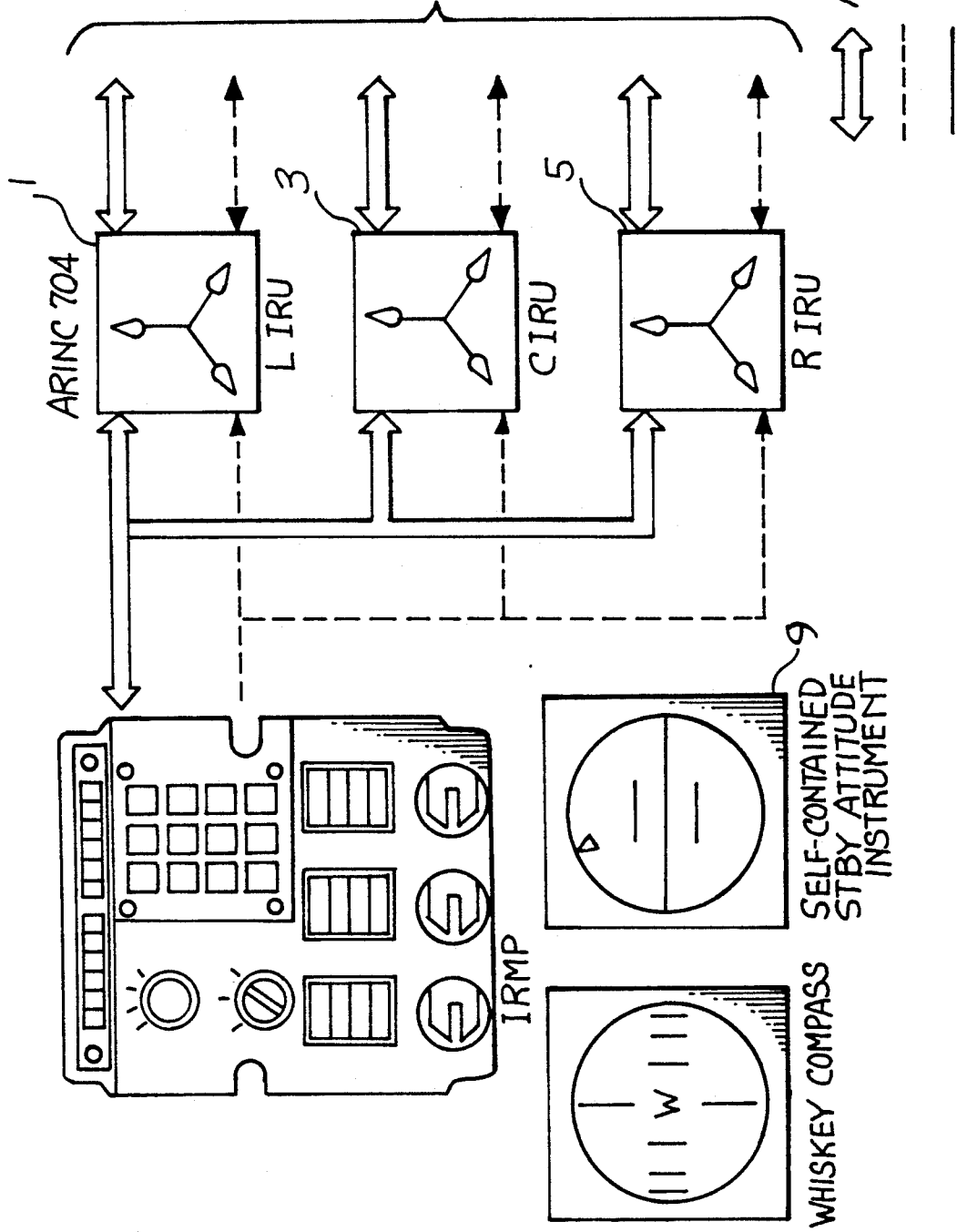
FIG. 4 is a schematic illustrating the current generation inertial reference system, and is labeled "prior art"

An ADIRS in accordance with the invention is therefore many times more reliable than the conventional IRU system shown in FIG. 4. The reason for such reliability is that any three gyros can be used with any three accelerometers to provide navigational functions. When a gyro or accelerometer fails, it may be taken out of service without significantly degrading the navigation function of the ADIRS. By way of comparison, in the system of FIG. 4, for each IRU 1, 3, 5 shown there, each must have six fully-operational sensors (three gyros and three matching accelerometers) to have a functional system. Loss of one sensor out of the six, whether it is a gyro or an accelerometer, takes the entire IRU out of service, thus wasting the remaining five sensors.

As is evident from the sensor assembly 60 shown in FIG. 6, each sensor module 62, 64, 66, 68, 70, 72 is physically partitioned to facilitate the separation and mechanical replacement of a failed component part. The processor 16, 18, 20, 22 and voter 24, 26, 28 portions of the ADIRS are preferably physically configured in similar fashion.

An ADIRS in accordance with the invention assumes full responsibility for determination of its own health. Thus, the ADIRS' redundant resources are used to detect and isolate failed modules, and to reconfigure themselves to use only healthy modules. Fault detection and isolation using comparisons of redundant modules and/or majority voting provides high coverage, approaching 100% for random faults, so long as a minimum number of healthy redundant modules remain. This high integrity fault coverage and diagnostic capability eliminates the need for complex shop test equipment or test programs. Also, no voting in user subsystems such as autopilot, FMC, auto-throttle, etc. is required.

The description set forth above is the currently-known best way to carry out the invention. It is to be understood and appreciated that the preceding description is not to be taken in the limiting sense. Further developments in the technology relating to the advanced ADIRS disclosed herein may reveal that there are alternative ways of implementing the invention which provide better performance or otherwise have certain attributes which are more desirable. For these reasons, the invention is not limited by the preceding description, but is to be limited only by the subjoined patent claim or claims, wherein such claims are to be interpreted in accordance with the conventional, well-established doctrines of patent claim interpretation.

What is claimed is:

1. An inertial navigation reference system, comprising:
    a plurality of greater than three redundant gyroscopes, any one of said gyroscopes being skewed with respect to all of the others, each gyroscope being operable to provide an output signal;
    a plurality of greater than three redundant accelerometers, any one of said accelerometers being skewed with respect to all of the other accelerometers, each accelerometer also being operable to provide an output signal;
    a plurality of redundant processor circuits, each being operable to receive the output signal from each one of said gyroscopes and accelerometers, and to calculate navigational reference signals therefrom, and said plurality of processor circuits operating in parallel so that all of said processor circuits receive said output signals and produce said navigational signals substantially simultaneously; and
    a plurality of redundant voter circuits, each voter circuit being operable to receive the navigational reference signals produced by each one of said processor circuits, and to output said navigational reference signals from at least one of said processor circuits to an avionics bus, said plurality of voter circuits operating in parallel so that all of said voter circuits receive said navigational signals from all said processor circuits substantially simultaneously, and further, each voter circuit being further operable to discard the navigational reference signals of a malfunctioning processor circuit; and
    wherein each processor circuit is further operable to discard the output signal of a malfunctioning gyroscope or accelerometer, and each processor circuit is still further operable to monitor the output of all of said voter circuits, and to discard the output of a malfunctioning voter circuit.

2. The inertial navigation reference system of claim 1, wherein said plurality of redundant gyroscopes includes six gyroscopes, each of which is skewed with respect to the others.

3. The inertial navigation reference system of claim 1, wherein said plurality of redundant accelerometers includes six accelerometers, each of which is skewed with respect to the others.

4. The inertial navigation reference system of claim 1, wherein said plurality of redundant processor circuits includes at least four processor circuits.

5. The inertial navigation reference system of claim 1, Wherein said plurality of voter circuits includes at least three voter circuits.

6. The inertial navigation reference system of claim 1, wherein said processor circuits are operable to discard a malfunctioning gyroscope by comparing signals from preselected sets of three gyroscopes.

7. The inertial navigation reference system of claim 6, wherein said processor circuits are operable to discard a malfunctioning accelerometer by comparing signals from preselected sets of three accelerometers.

8. A fault-tolerant navigation reference system, comprising:
    a plurality of six independent accelerometers, each of which is in skewed orientation with respect to the others;
    a plurality of six independent gyroscopes, each of which is in skewed orientation with respect to the other gyroscopes; and
    at least four independent but parallelly operating processor circuits, each individual processor circuit being connected to each gyroscope and each accelerometer to receive an output signal from each gyroscope and each accelerometer, and each processor circuit being operable to discard the output signal of any malfunctioning accelerometer or gyroscope, and to calculate navigational reference signals from the output signals of the remaining accelerometers or gyroscopes, so long as at least four accelerometers and at least four gyroscopes remain functional, said processor circuits calculating said navigational reference signals substantially simultaneously.

9. The fault-tolerant navigation reference system of claim 8, further including at least three independent but parallelly operating voter circuits, each voter circuit being connected to each processor circuit to receive the navigational reference signals produced by each processor circuit, and each voter circuit being operable to output said navigational reference signals from at least one of said processor circuits onto an avionics bus.

10. A fault-tolerant navigation reference system, comprising:
    a plurality of six independent accelerometers, each of which is in skewed orientation with respect to the others;
    a plurality of six independent gyroscopes, each of which is in skewed orientation with respect to the other gyroscopes; and processor means operable to calculate navigational reference signals from the outputs of said accelerometers and gyroscopes, and further operable to discard the output of any malfunctioning accelerometer or gyroscope, and to calculate navigational reference signals from the remaining accelerometers or gyroscopes, so long as at least four accelerometers and at least four gyroscopes remain functional;

wherein said processor means includes at least four independent but parallelly operating processor circuits, each individual processor circuit being connected to each gyroscope and accelerometer, and operable to receive the output signal from each gyroscope and accelerometer, and to calculate navigational reference signals therefrom, said processor circuits calculating said navigational reference signals substantially simultaneously;

wherein said processor means further includes at least three independent but parallelly operating voter circuits, each voter circuit being connected to each processor circuit, and operable to receive the navigational reference signals produced by each processor circuit, and further, each voter circuit being operable to output said navigational reference signals from at least one of said processor circuits onto an avionics bus; and wherein each processor circuit is further operable to monitor the output of each voter circuit onto said avionics bus, and to discard the output of a malfunctioning voter circuit.

* * * * *